(12) United States Patent
Tamura

(10) Patent No.: US 7,981,378 B2
(45) Date of Patent: Jul. 19, 2011

(54) WATER ACTIVATION PIECE FOR USE IN FLOW PASSAGE, ARRANGEMENT STRUCTURE OF THE WATER ACTIVATION PIECE, AND WATER ACTIVATION DEVICE USING THE WATER ACTIVATION PIECE AND THE ARRANGEMENT STRUCTURE

(76) Inventor: Kikuo Tamura, Koriyama (JP)

( * ) Notice: Subject to any disclaimer, the term of this patent is extended or adjusted under 35 U.S.C. 154(b) by 493 days.

(21) Appl. No.: 11/990,771

(22) PCT Filed: Aug. 22, 2005

(86) PCT No.: PCT/JP2005/015200
§ 371 (c)(1),
(2), (4) Date: Jun. 6, 2008

(87) PCT Pub. No.: WO2007/023516
PCT Pub. Date: Mar. 1, 2007

(65) Prior Publication Data
US 2009/0101564 A1 Apr. 23, 2009

(51) Int. Cl.
*B01J 19/00* (2006.01)
*F02M 37/22* (2006.01)
*B01D 35/00* (2006.01)
(52) U.S. Cl. .................. 422/224; 210/243; 210/205
(58) Field of Classification Search .................. 422/224; 210/190, 198.1, 243, 252, 512.1, 205
See application file for complete search history.

(56) References Cited

U.S. PATENT DOCUMENTS

| 5,814,227 A * | 9/1998 | Pavlis ........................ 210/696 |
| 2004/0026307 A1 * | 2/2004 | Tamura ........................ 210/205 |

FOREIGN PATENT DOCUMENTS

| JP | 02-083084 | 3/1990 |
| JP | 08084984 A * | 4/1996 |
| JP | 10-085767 | 4/1998 |
| JP | 2004-073901 | 3/2004 |

OTHER PUBLICATIONS

Machine translation of JP 08-084984, which was published Apr. 2, 1996.*

* cited by examiner

*Primary Examiner* — Walter D Griffin
*Assistant Examiner* — Natasha Young
(74) *Attorney, Agent, or Firm* — Muramatsu & Associates

(57) ABSTRACT

A water activation device is configured by arranging a plurality of water activation pieces in a holder in a manner that the water activation pieces do not contact with each other where an axial direction of each piece is established along the flow passage. Multiple layers of the holders are established in an internal space of the body of the water activation device. Each of the water activation piece is formed as a cylindrical body with a through hole that includes an axis. Spiral grooves are formed non-continuously or continuously on an inner surface and outer surface of the water activation piece so that when the axis of the water activation piece is established in the flow passage, the water activation piece axially rotates by the flow pressure. The spiral grooves are formed in a rightward rotation (clock-wise) manner in plan view.

6 Claims, 5 Drawing Sheets

US 7,981,378 B2

WATER ACTIVATION PIECE FOR USE IN FLOW PASSAGE, ARRANGEMENT STRUCTURE OF THE WATER ACTIVATION PIECE, AND WATER ACTIVATION DEVICE USING THE WATER ACTIVATION PIECE AND THE ARRANGEMENT STRUCTURE

FIELD OF THE INVENTION

The present invention belongs to a field of water activation device to be established in a water flow passage such as a water supply pipe for water activation, and the present invention relates to a water activation piece for use in the flow passage of the water activation device, a structural arrangement of the water activation piece, and the water activation device using the water activation pieces and its structural arrangement.

BACKGROUND OF THE INVENTION

Ground water made from rain and snow that have accumulated in mountains and permeated the ground eventually becomes spring water and forms head streams of river. During this process, either by subdivision of hydrogen bond group (cluster) of water molecules caused by infrared rays, negative ion actions, or magnetic actions of minerals and rocks, or by receiving the electrons generated by the friction among water molecules created from collision against rocks or waterfall, the water becomes reduced, or namely, activated.

However, the various effects of the activated condition will be gradually lost since the activated condition cannot be maintained for a long period of time. Due to this, a device (hereafter referred to as "water activation device") has been developed for applying the principle of the above-mentioned activation process, where the water that is losing its activation effects is reactivated by water flow friction which is caused by flowing and stirring the service water against ball-shaped ceramic baked particles (hereafter referred to as "ceramic balls") arranged in an internal space or magnetic fields formed in the internal space.

For example, a water activation device that stores several cases in a tubular body which is capable of intervening through the flow pipe of the service water has been disclosed where each of the cases stores ceramic balls in the internal space and is formed with flow holes (for example, see Patent Document 1).

Similar to the invention of Patent Document 1, another water activation device has been disclosed (for example, see Patent Document 2), where approximated infrared radiation ceramic group discs formed with small flow holes are established in multiple layers and in a freely rotating manner within a main body where the main body is capable of intervening through the flow pipe of the service water where each of these ceramic discs are rotated by contact wings formed thereon.

Patent Document 1: Japanese Laid-Open Publication No. 2001-058191 (pages 3-5, FIG. 1)
Patent Document 2: Japanese Laid-Open Publication No. 2000-107752 (pages 2-3, FIG. 1)

DISCLOSURE OF THE INVENTION

Problems to be Solved by the Invention

However, the limited length of the water passage in the conventional water activation device gives rise to problems such as insufficiency in activation effect and fails in subdividing the water molecules and thus fails in lowering the voltage of oxidation-reduction.

For example, in the water activation device in Patent Document 1, the water flow often becomes sluggish or retained because the ceramic balls are unevenly distributed, which results in loss of the water pressure. Moreover, the wearing-out of the ceramic balls and contacts of the ceramic balls over a long period of time reduce the amount of the ceramic balls and cause the problems such as reduction of the activation effect and needs of maintenance works for replacing the ceramic balls.

In Patent Document 2, since the ceramic disc is rotated to stir the water flow, the contact between the water activation material and the water is reduced in comparison to that in Patent Document 1, which may lead to reduced effects of infrared rays, negative ion actions, and magnetic actions. Further, the ceramic disc formed with a contact wing thereon is expensive to manufacture, and its rotating state cannot be maintained when the rotation mechanism becomes damaged from the usage over a long period of time, resulting in functional deterioration.

Therefore, in view of such circumstances, the present invention is made to provide a water activation piece for use in a flow passage which is capable of forming a more efficient water flow stirring state for activating water where the water activation piece is formed in a simple structure and its flow passage length is limited. The present invention further provides an arrangement structure of this water activation piece, and a water activation device using the water activation piece and its arrangement structure.

Means to Solve the Problems

In order to solve the above-mentioned problems, the water activation piece of the present invention is structured as follows:

Namely, a water activation piece 4 is a column-like body, for example, a circular cylindrical body of predetermined length, and is arranged in the water flow passage, and an axis 41 of the water activation piece 4 is established in the direction of the flow passage, one or more concaves 43 or convexes 43 that axially rotate the water activation piece 4 by the flow pressure are formed non-continuously or continuously around an outer surface of the water activation piece 4.

Further, a through hole 42 that includes the axis 41 is formed through this column-like water activation piece 4. Namely, the water activation piece 4 is formed as a cylindrical column body and the inner surface of this through hole 42 is established in the flow passage, and one or more concaves 43 or convexes 43 that axially rotate the water activation piece 4 are formed on the inner surface non-continuously or continuously. These concaves or convexes are formed, for example, as spiral grooves 43, and on both the outer surface and the inner surface, the spiral grooves 43 are formed in a rightward rotation (clock-wise) manner in plan view.

The arrangement structure of the above-mentioned water activation piece 4 with respect to the flow passage is as follows:

Namely, it is arranged that one or more water activation pieces 4 are held in a holder 3 of predetermined structure where the axial direction thereof is established along the flow passage in such a way that these water activation pieces are not brought into contact with each other, and further, multiple layers of the holders 3 are established along the flow passage. In the holder 3, a plurality of flow openings 34 having wing pieces 34a, 34c, and 34d for changing the flow lines in the flow passage are established in the directions that are approximately perpendicular to the flow passage.

In a water activation device 1 related to the present invention, the water activation piece 4 of the above structure or the group of water activation pieces 4, 4, . . . are established in an internal space 26 of the water activation device 1. The water activation device 1 is configured by a conductive body 2 having an in-flow opening 24a and an out-flow opening 24b, a conductive coating body 23 which covers the outer surface of the conductive body 2 through insulating material 22. The conductive coating body 23 is insulated from a flow pipe 5.

The reference numerals in the parentheses in the claims and in the "Means to Solve the Problem" section are those in the accompanying drawings for better understanding of the structure of this invention, and are not limited to the particular aspect in these drawings.

Effect of the Invention

Since the water activation piece of the present invention has the above-mentioned structure, when it is established in the flow passage, the surface area where the water activation piece and the water flow are brought into contact with each other increases and the water activation piece itself axially rotates by the concaves or convexes or by the spiral grooves formed on the outer surface and (or) the inner surface of the through hole, thus, generating multiple swirls in the predetermined direction (rightward in plan view) of the flow passage. As a consequence, the water flow can increase the surface area as noted above where the water activation piece and water flow come in contact with one another and achieve an efficient water activation effect by the swirl. Especially, since the swirl generates electrons caused by the collision and friction between the water molecules and prompts the water activation effect, it contributes to an even more efficient water activation when the length of the flow passage is restricted.

Further, since one or more water activation pieces are held in the holder which causes the changes in the flow line of the water flow and such activation pieces are established in multiple stages, the area that generates the swirls is increased accordingly to increase the degree of water activation, where the water activation condition can be maintained over a long period of time.

The water activation device established with such a water activation piece or groups of water activation pieces is maintenance free and can achieve an efficient water activation effect in a restricted flow passage length unlike the conventional device, thereby enabling to remarkably contribute to the industry.

BEST MODE FOR IMPLEMENTING THE INVENTION

A specific example of the embodiment of the water activation device related to the present invention will be further explained with reference to the drawings. FIG. 1 is a perspective view of the water activation device in the present embodiment where a part of it is cut out, FIG. 2 is an axial cross sectional view of the water activation device in the present embodiment, FIG. 3 is a perspective view showing how the water activation device is assembled in the present embodiment, FIG. 4 is a perspective view of the water activation piece and a perspective view of the holder of the water activation device in the present embodiment where a part of it is cut out, and FIG. 5 is plan view showing the arranged condition of the water activation piece within the holder of the water activation device in the present embodiment.

First, the water activation piece and the structural arrangement of the water activation piece along with the water activation device consisting of these pieces and its structure in the present embodiment will be explained in detail below.

The water activation device 1 of the present embodiment, as shown in FIG. 1 and FIG. 2, is configured by arranging multiple stages of holders 3 for holding a plurality of water activation pieces 4 in the internal space of the body 2. The water activation device 1 is normally connected to the flow pipe 5 such as a water pipe and established under the ground or is connected to a middle of the pipe in a house.

The body 2 is comprised of a main body 21 that is a metallic cylindrical pipe formed in a predetermined length, an insulation material 22 that is an electrically non-conductive material and covers the entire outer surface of the main body 21, and a conductive coating body 23 that coats the outer surface of the insulation material 22. Moreover, a connecting pipe 24 for serially connecting to the flow pipe 5 such as a water pipe is connected in a watertight manner at each end of the main body 21 in a manner to cover the openings thereof. As for the attachment of the connecting pipe 24 to the main body 21, an insulation ring 25 is intervened in a circular manner between the connecting pipe 24 and each end of the coating body 23 that faces the connecting pipe 24, thereby electrically insulating between the connecting pipe 24 and the coating body 23. Further, in an inner surface of the open end of the connecting pipe 24 attached to the main body 21, an internal screw 24c for connecting in a watertight manner to the flow pipe 5 is established. One side of this connecting pipe 24 is an in-flow opening 24a, and the other side is an out-flow opening 24b.

The body 2 is designed to reduce the pressure damage during the water flow by establishing the in-flow opening 24a and the out-flow opening 24b as mentioned above along the same straight line or same curved line. Further, the water activation device 1 does not require an earth connection if it is built under the ground, however, it is preferable for the coating body 23 to have an earth connection if the water activation device is established above the ground.

In a cylindrical internal space 26 of the body 2, the holder 3 mainly made through resin molding is fitted in an inner surface of the internal space 26. A plurality of holders 3 are arranged in multiple stages continuously on the same axis. The number of holders 3 arranged in this manner is properly selected based on the amount of water flow and the desired efficiency of the water activation.

The holder 3 in this embodiment comprises a disc-like retainer 31 formed with multiple flow openings 34 in a mesh-like manner, a connection column 32 of predetermined height that is vertically formed at the center of the retainer 31, a cylindrical side wall 33 formed with a taper with an outer opening on the top thereof that is lower than the connecting column 32 so that the outer edge of the other retainer 31 is enclosed by the tapered opening, and three belt-like retaining walls 31a formed on the inner side of the side wall 33 in an upright manner from the retainer 31, where above components are integrally formed.

The holder 3 is capable of holding one or more water activation pieces 4 in a predetermined arrangement by the retainer 31, the side wall 33, and the retaining wall 31a. In addition, a connection column opening 32a of predetermined diameter is formed on the top end of the connection column 32, where the other holders 3 arranged above and below the holder 3 is fitted on the same axis to allow connection of the holders 3 in multiple stages.

The in-flow opening 34 of the holder 3 is comprised of a plurality of revolving wing pieces 34a that radially extend from the connection column 32 and connect to the side wall 33, inner rings 34b that connect to the revolving wing pieces 34a in a circular direction and is sequentially arranged with the connecting column 32 in a concentric circle with a predetermined space, an inner wing piece 34c, and two outer wing pieces 34d. The dimension of the bottom side of the inner wing piece 34c and the outer wing pieces 34d is made slightly longer in height so that these pieces protrude downwardly from the side wall 33 and the revolving wing piece 34a.

An inclined surface where the water coming from above (arrow a) flows in a rightward rotation (clockwise, arrow d) manner in plan view is formed on the revolving wing piece 34a. Also, an inclined surface for deflecting the water in an inward direction (arrow e) is formed on the inner wing piece 34c, and an inclined surface for channeling the water in an outward direction (arrow f) is formed on the outer wing piece 34d. The inclined surface formed on each wing piece 34a, 34c, and 34d individually deflects the water flow in the rightward direction, inward direction, and outward direction with respect to the internal space of the body 2, hence, generating turbulence as a result.

The arrangement and number of the inner wing piece 34c and the outer wing piece 34d is not limited to that of the present embodiment, and can be properly changed, for example, all of them can be the inner wing pieces 34c or all of them can be the outer wing pieces 34d, or arrange the inner wing piece 34c at the outer peripheral or the outer wing piece 34d at the inner peripheral.

The retainer 31 of the holder 3 structured as described above holds one or more water activation pieces 4 in a predetermined arrangement. The water activation piece 4 is a cylindrical body where a burning body using multiple elemental minerals (such as ceramic and artificial tourmaline) as a main component and is formed with a through hole 42 including an axis 41. The height of the water activation piece 4 is slightly lower than the connection column 32 of the holder 3, where its diameter is about a half of the radius of the retainer 31 and the through hole 42 is formed slightly larger than the connection column 32.

Moreover, the outer surface and the inner surface of the water activation piece 4 form spiral grooves 43 that are concaved and convexed in a rightward rotation (clockwise) manner in plan view. By the spiral grooves 43, the surface area of the water activation piece 4 increases substantially, and the water flow coming from the above the water activation piece 4 (arrow a) becomes the rightward deflecting flow (arrow c). In the present embodiment, the spiral grooves 43 are formed in a continuous manner on the outer surface and inner surface, however, they can be formed in a non-continuous manner as well.

The water activation pieces 4 of the above-mentioned structure in the present embodiment are held in the arrangement where each holder 3, 3 . . . are arranged in multiple stages in the internal space 26 of the body 2 as described below. Namely, the connection column 32 of the holder 3 goes into the through hole 42 to fit one water activation piece 4, then, around this activation piece, several water activation pieces 4 (six in the present embodiment) are arranged inside of the retaining wall 31a in a manner that they will not contact with one another. Namely, one water activation piece 4 is arranged at the center, while several other water activation pieces 4, 4 . . . are arranged in a circular manner equally around the center water activation piece 4.

By the arrangement structure of the water activation piece 4, the surfaces of the water activation piece 4 fully contacts with the water flow, where the water activation piece 4 itself axially rotates in the rightward (clockwise, arrow b) direction by the spiral grooves 43.

Effects

The water activation device 1 using the water activation piece 4 and the arrangement structure thereof achieve the following effects.

First, the incoming water from the in-flow opening 24a of the body 2 reaches the retainer 31 while bumping into the water activation pieces 4 held in the retainer 31 of the holder 3 and passing therethrough. At this time, each water activation piece 4 axially rotates in the rightward direction (arrow b) at its arranged location so that the incoming water becomes a rightward (arrow c) deflected flow because it is arranged that the water activation pieces 4 will not contact with each other and the spiral grooves 43 are formed on the outer surface and the inner surface.

Next, the incoming water that has reached the retainer 31 by the rightward deflected flow basically generates a plurality of rightward swirls, namely, diverse turbulences, when passing through the in-flow opening 34, by the revolving wing piece 34a, inner wing piece 34c, and outer wing piece 34d which add the deflection of the rightward flow (arrow d), the inward deflected flow (arrow e), and the outward deflected flow (arrow f) to the rightward deflected flow.

The incoming water in such a turbulent state flows out (arrow g) from the out-flow opening 24b where the same effects mentioned above are added thereto every time it passes through each holder 3 arranged in the multiple stages in the internal space 26 of the body 2.

This outgoing water becomes reduced by subdivision of hydrogen bond groups (cluster) of the water molecules caused by infrared rays of the water activation piece 4 and by receiving electrons generated by the friction between the water molecules, in other words, it becomes activated. The degree of the activation is high because of the diverse turbulence where several rightward swirls are deflected inward and outward, namely, it generates an efficient stirring effect, which immediately amplifies an electrical charge to raise the state of activation by the structure of the water activation pieces 4 and the holder 3 that holds these pieces.

In addition to the above-mentioned effect, by fitting the outer shape (outer edge) of the holder 3 into the inner surface of the internal space 26 of the body 2, all of the incoming water passes through the in-flow opening 34 established on the retainer 31 of the holder 3 and bumps into the water activation pieces 4, thereby amplifying the activation effect. The degree of activation can be properly adjusted by increasing or decreasing the number of holders 3 arranged in the multiple stages.

Further, by establishing the electrical insulation between the internal space 26 of the body 2 and the coating body 23, the water activation device 1 will function as an electrical double layer capacitor, which prevents the deterioration of the activation effect caused by the action that the electrons generated in the internal space attract positive charges from the outside of the body 2, and which is also effective in preventing corrosion on the water activation device 1.

FEASIBILITY OF OTHER EMBODIMENTS

The water activation piece 4 of the above-mentioned embodiment is formed with convex and concave spiral grooves 43 on the inner surface and outer surface thereof, however, these spiral grooves 43 can be combined with independent fins (wings).

Also, the water activation piece 4 is a cylindrical body formed with the through hole 42 on the axis for axially rotating the piece itself, however, a plurality of through holes 42 can be formed for one water activation piece 4 (for example, form several through holes in an artificial coal manner).

Further, the number of the water activation pieces 4 incorporated in the holder 3 can be freely increased or decreased so long as it can prevent from contacting one another, and can change the arrangement of the water activation pieces for each of the holders 3 that are established in the multiple stages.

In addition to the above, in the present embodiment, the water activation device 1 is structured so that the flow pipe 5 and body 2 are connected on the same axis, however, it is not limited to this embodiment, and for example, it can be structured where an in-flow opening and an out-flow opening for treated water are established on a cylindrical, calyx-like, or rectangular storage tank that is watertight and in proper condition that has a smooth inner side for passing the water and established with several holders along the flow line (not shown).

DESCRIPTION OF REFERENCE NUMERALS

Figure 1:
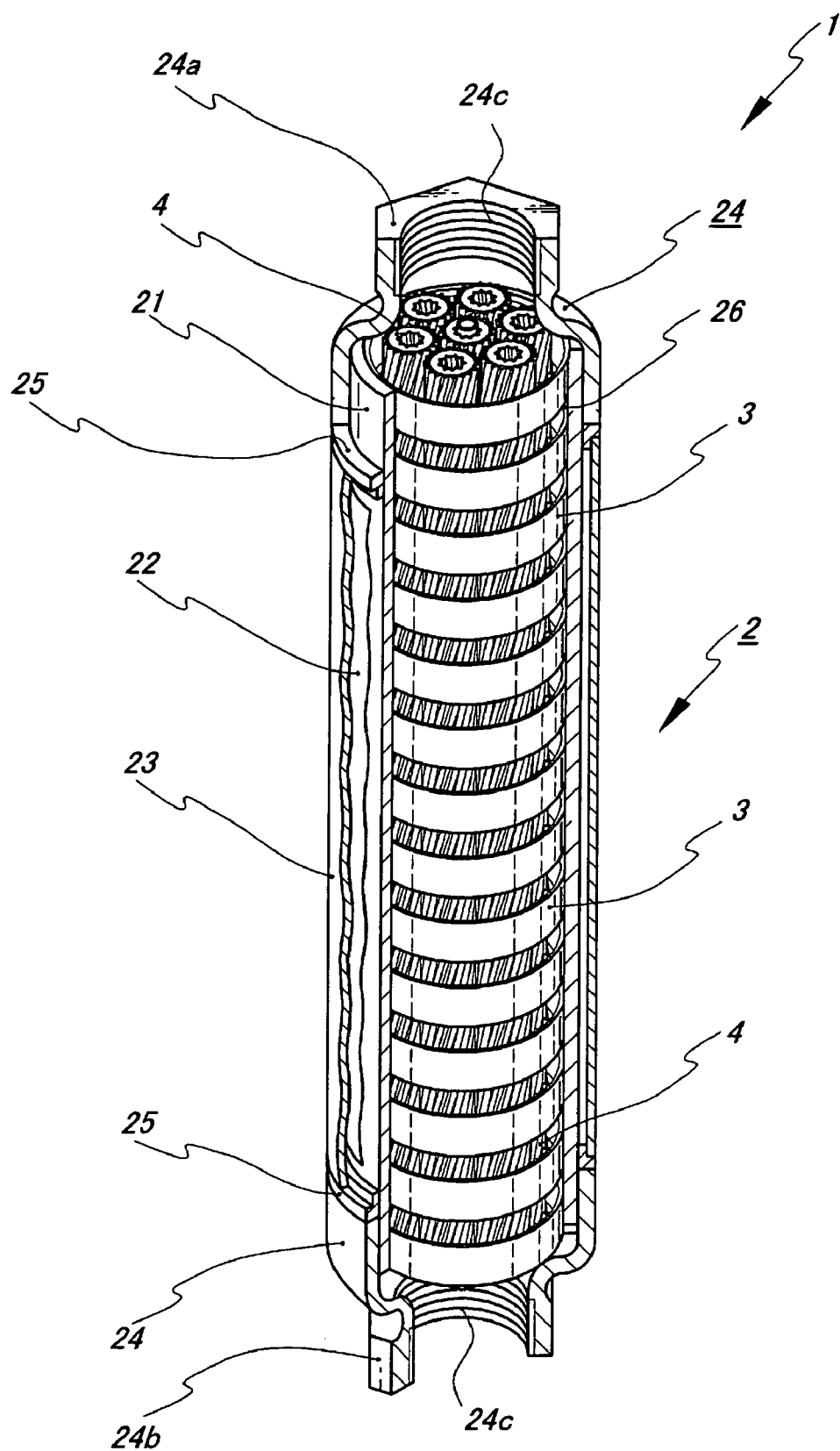
FIG. 1 is a partially cut-out perspective view showing the water activation device in the present embodiment.
Figure 2:
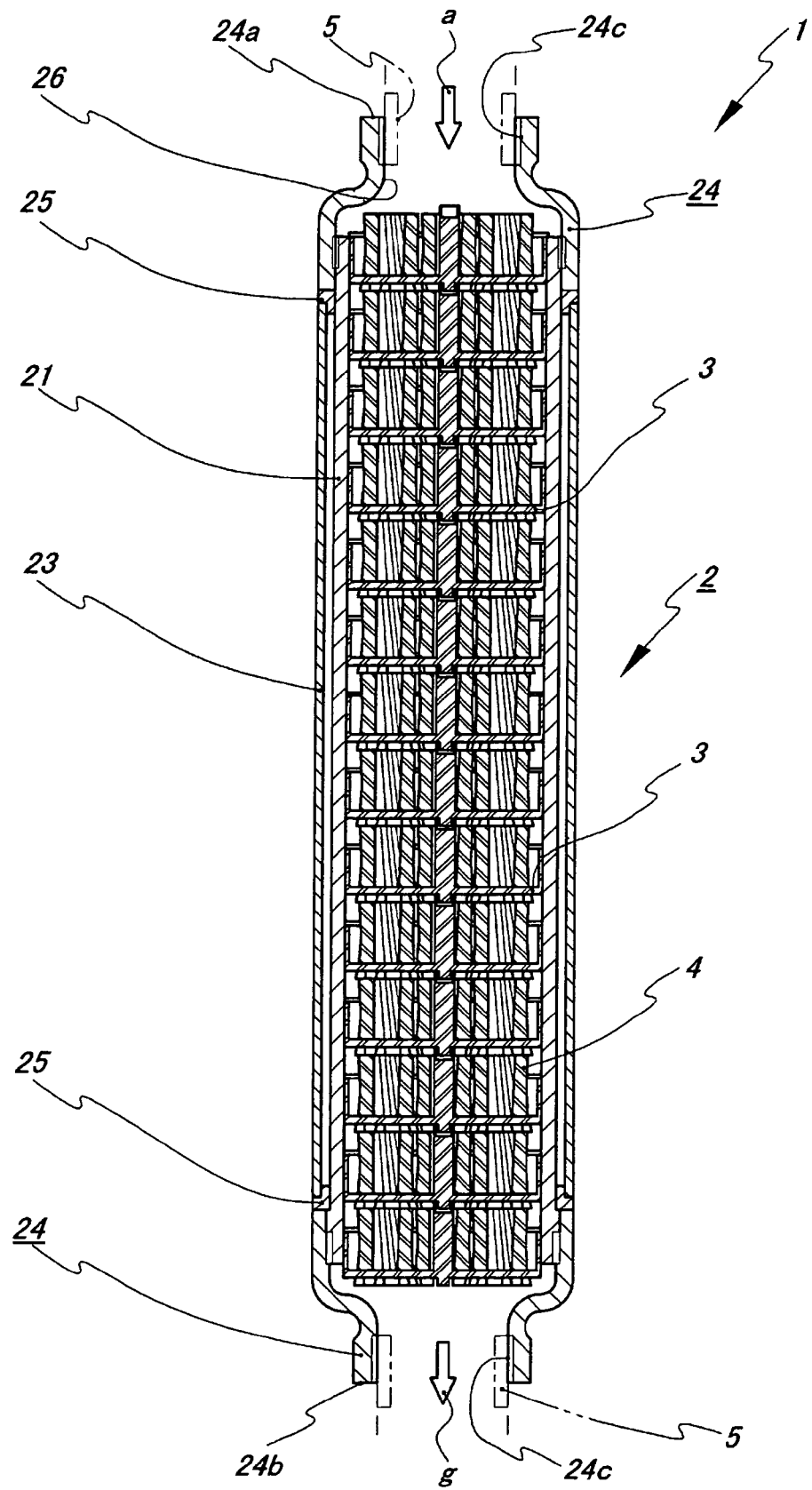
FIG. 2 is an axial cross sectional view of the water activation device in the present embodiment.
Figure 3:
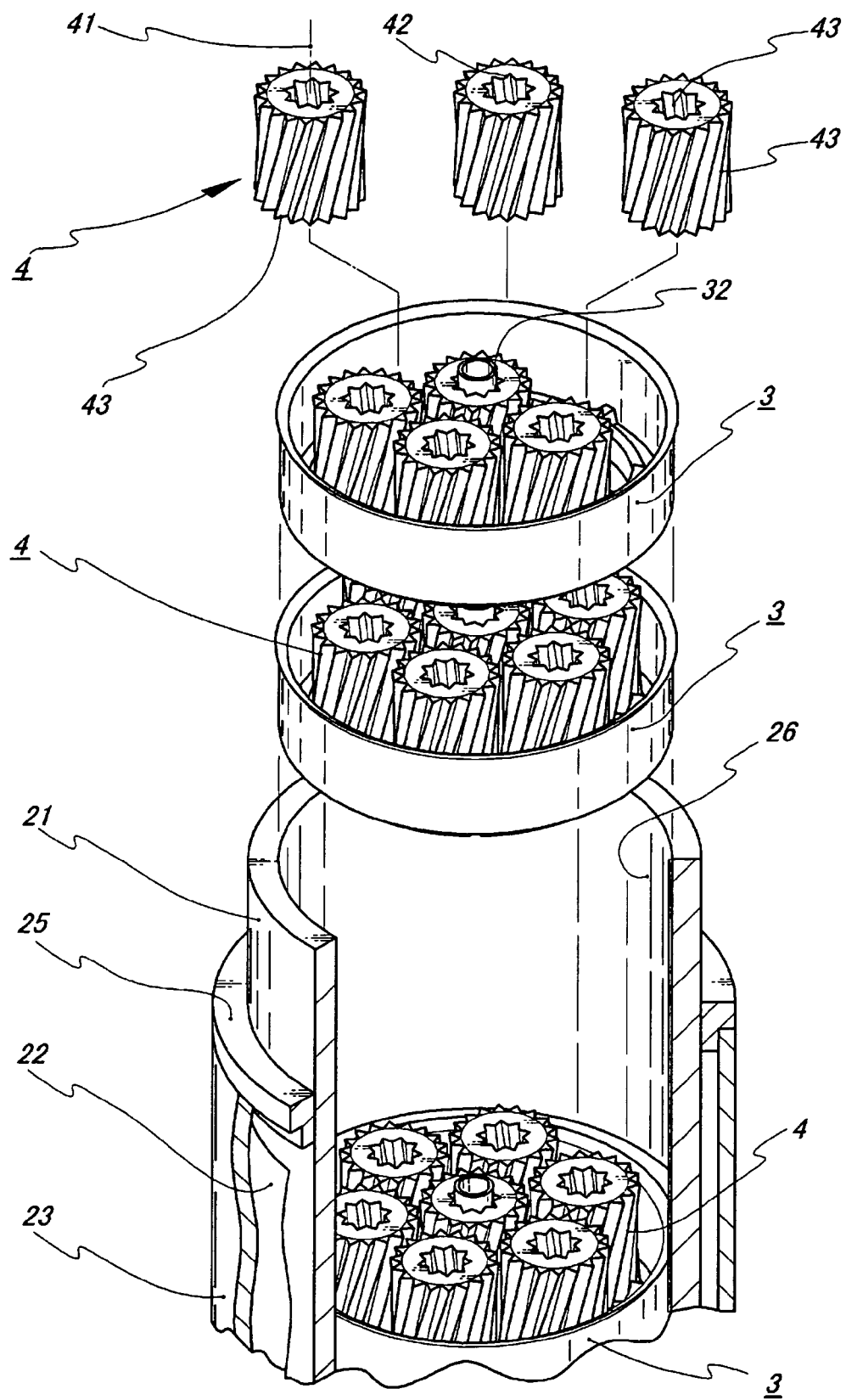
FIG. 3 is an exploded perspective view of the water activation device in the present embodiment.
Figure 4:
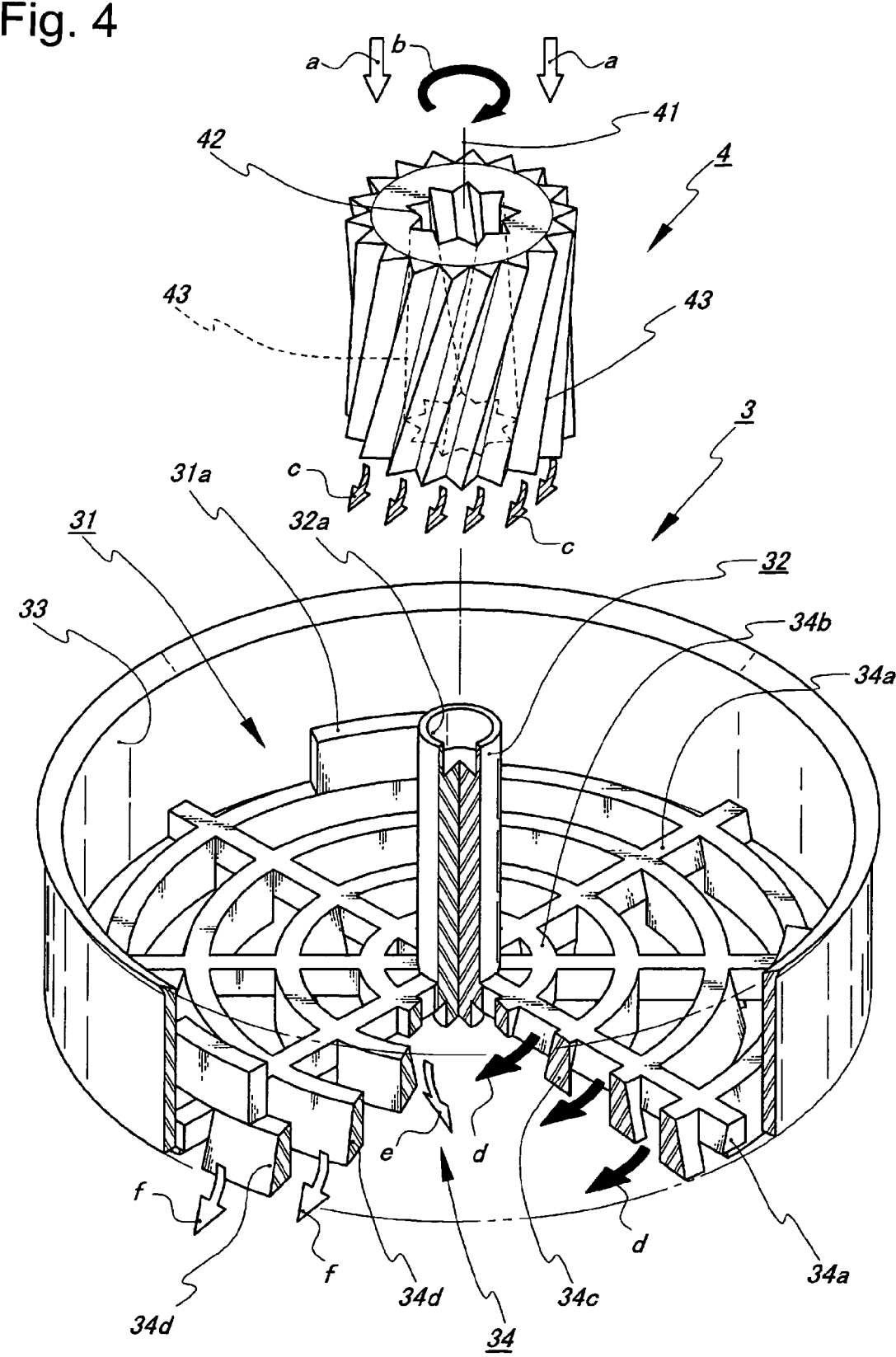
FIG. 4 is a partially cut-out perspective view of the water activation piece and the holder of the water activation device in the present embodiment.
Figure 5:
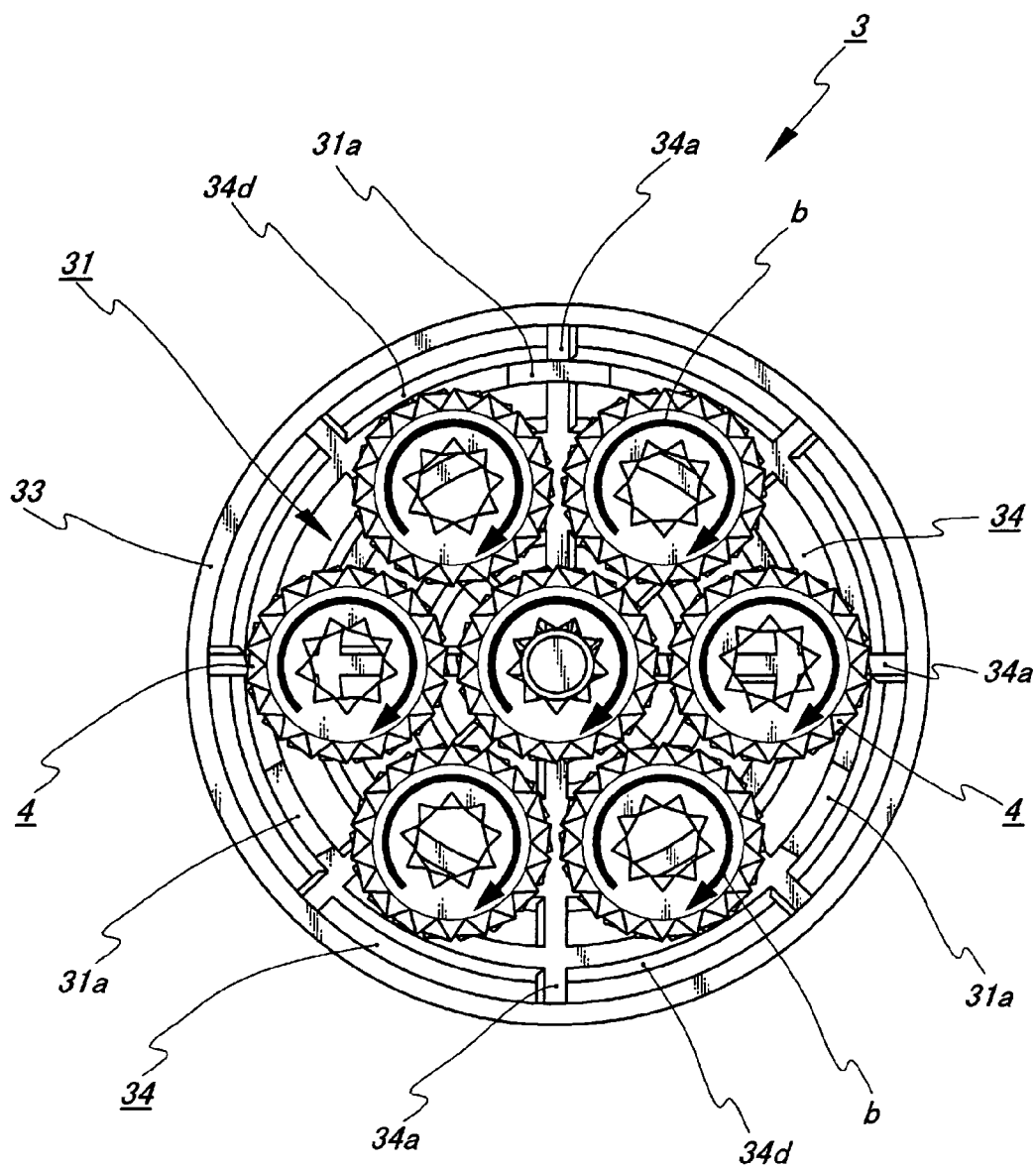
FIG. 5 is a plan view showing the arrangement of the water activation piece within the holder of the water activation device in the present embodiment.

1 Water activation device
2 Body
21 Main body
22 Insulation material
23 Coating body
24 Connecting pipe
24a In-flow opening
24b Out-flow opening
24c Internal screw
25 Insulation ring
26 Internal space
3 Holder
31 Retainer
31a Retaining wall
32 Connection column
33 Side wall
34 In-flow opening
34a Revolving wing piece
34b Inner ring
34c Inner wing piece
34d Outer wing piece
4 Water activation piece
41 Axis
42 Through hole
43 Spiral groove
5 Flow pipe

What is claimed is:

1. A water activation device for activating water, comprising:
    a conductive body having an in-flow opening and an out-flow opening, thereby forming a water flow passage between the in-flow and out-flow openings,
    a plurality of holders arranged in an internal space of the conductive coating body in a manner of forming a plurality of stages along the water flow passage,
    a conductive coating body that covers an outer surface of said conductive coating body with an insulation material so that said conductive coating body is insulated from a flow pipe, and
    a plurality of water activation pieces mounted on said holder of each stage without contacting each other, each water activation piece being formed in a small lump with mineral as a main component in in said holder arranged in said conductive coating body,
    wherein each of said water activation pieces comprising a column-like body of predetermined length where an axis thereof is arranged along the water flow passage, a through hole formed in said column-like body about said axis, and wherein a plurality of spiral grooves are continuously or non-continuously formed on an inner surface of said through hole and an outside surface of the column-like body, and wherein said water activation pieces at each stage of said holders axially rotate when the spiral grooves on the inner surface of the through hole and the outer surface of the column-like body contact the water flow passage.

2. A water activation device as defined in claim 1, wherein said holder is comprised of multiple in-flow openings having wing pieces that are established approximately perpendicularly to the water flow passage for changing a direction of water flow.

3. A water activation device as defined in claim 2, wherein said wing pieces of said holder include a revolving wing piece which has an inclined surface for changing the direction of water flow to a rightward rotation (clockwise) in plan view, an inner wing piece which has an inclined surface for deflecting the water flow in an inward direction in plan view, and an outer wing piece which has an inclined surface for channeling the water flow in an outward direction in plan view.

4. A water activation device as defined in claim 3, wherein said wing pieces of said holder formed of the revolving wing piece, the inner wing piece, and the outer wing piece generate turbulence of water within each stage of said holder.

5. A water activation device as defined in claim 2, wherein said spiral grooves of said water activation piece are concaved and convexed in the same rotational direction in plan view both on the outer surface of the column-like body and the inner surface of the through hole.

6. A water activation device as defined in claim 5, wherein said rotational direction of said spiral grooves of said water activation piece is a rightward (clockwise) direction so that the water coming from the above is deflected to the rightward in plan view.

\* \* \* \* \*